United States Patent [19]

Sherrer

[11] Patent Number: 5,159,176
[45] Date of Patent: Oct. 27, 1992

[54] DEVICE FOR HEATING, BY INFRARED RADIATION, FIXED ON A WALL OR THE CEILING OF A ROOM OF A BUILDING

[76] Inventor: Fernand Sherrer, 2 rue Georges Bizet, 68170 - Rixheim, France

[21] Appl. No.: 576,411
[22] PCT Filed: Jan. 31, 1990
[86] PCT No.: PCT/FR90/00077
 § 371 Date: Sep. 25, 1990
 § 102(e) Date: Sep. 25, 1990
[87] PCT Pub. No.: WO90/09085
 PCT Pub. Date: Aug. 9, 1990

[30] Foreign Application Priority Data

Feb. 2, 1989 [FR] France .................. 89 01362

[51] Int. Cl.⁵ .............. H05B 3/34; F24D 13/00; F24D 19/02
[52] U.S. Cl. ................ 219/213; 219/543; 219/541; 219/537; 392/436; 338/316; 338/318
[58] Field of Search .............. 219/213, 543, 542, 541, 219/537; 392/433, 434, 436; 338/284, 288, 289, 316, 318

[56] References Cited

U.S. PATENT DOCUMENTS

| | | | |
|---|---|---|---|
| 1,811,474 | 6/1931 | Nagel ................... | 338/288 |
| 2,799,764 | 7/1957 | Chandler ............... | 392/435 |
| 2,961,522 | 11/1960 | Hammer ................ | 392/435 |
| 3,095,491 | 6/1963 | Deacon ................. | 219/213 |
| 3,265,858 | 8/1966 | MacGuire .............. | 219/213 |
| 3,522,415 | 8/1970 | Eisler .................... | 338/316 |
| 3,686,472 | 8/1972 | Harris ................... | 219/213 |
| 3,737,624 | 6/1973 | Eilenberger . | |
| 3,763,349 | 10/1973 | Desloge ................. | 219/553 |
| 3,786,230 | 1/1974 | Brandenberg Jr. ....... | 219/537 |
| 3,798,419 | 3/1974 | Maake . | |
| 3,809,859 | 5/1974 | Wells .................... | 338/316 |
| 4,107,512 | 8/1978 | Brandenburg, Jr. . | |
| 4,310,745 | 1/1982 | Bender .................. | 219/213 |
| 4,354,091 | 10/1982 | Bain . | |
| 4,468,557 | 8/1984 | Bylin et al. . | |
| 4,602,239 | 7/1986 | Harper .................. | 219/541 |
| 4,781,169 | 11/1988 | Henke et al. ........... | 126/390 |
| 4,880,952 | 11/1989 | Hirai et al. ............ | 219/407 |
| 5,010,234 | 4/1991 | Scherrer et al. ........ | 392/435 |

FOREIGN PATENT DOCUMENTS

| | | | |
|---|---|---|---|
| A320349 | 6/1989 | European Pat. Off. . | |
| 2409703 | 9/1975 | Fed. Rep. of Germany ...... | 219/213 |
| 3039444 | 5/1982 | Fed. Rep. of Germany . | |
| 1340968 | 10/1963 | France . | |
| 2518712 | 6/1983 | France . | |
| 2559185 | 8/1985 | France . | |
| 661152 | 11/1951 | United Kingdom ........... | 392/408 |
| 2126057 | 3/1984 | United Kingdom . | |

Primary Examiner—Bruce A. Reynolds
Assistant Examiner—John A. Jeffery
Attorney, Agent, or Firm—McAulay Fisher Nissen Goldberg & Kiel

[57] ABSTRACT

The present invention relates to a device for heating, by infrared radiation, fixed on a wall 3 or beneath the ceiling of a room of a building, comprising a flat infrared radiation emitter constituted by a sheet 5 made of an electrically conducting material connected to a source 15, 16 of supply of low-voltage electric current, characterized in that the electrically conducting sheet 5 forms part of at least one composite band 4 and it is coated, on its face turned towards the interior of the room to be heated, with a thin black layer, with high emissive power, and, on the opposite side, with a sheet 8 forming reflector of the infrared radiation in the direction of the interior of the room.

20 Claims, 1 Drawing Sheet

DEVICE FOR HEATING, BY INFRARED RADIATION, FIXED ON A WALL OR THE CEILING OF A ROOM OF A BUILDING

The present invention relates to a device for heating, by infrared radiation, fixed on a wall or the ceiling of a room of a building, in order to ensure heating of that room.

Heating devices of this type are already known which use infrared radiation emitter elements heated by Joule effect and connected, to that end, to a source of electric current. The infrared radiation emitter elements are constituted by sheets, films, fabrics, etc... made of electrically conducting material and which are stretched at a certain distance from the wall or the ceiling of the room to be heated. Such devices are described for example in Patents DE-0-2 202 208 and DE-A-2 310 119.

As described in Patent DE-0-3 026 098, a device for heating by the floor is also known, which essentially comprises an electrically conducting metal sheet extending along a sinuous path or forming meanders imbricated in one another and which bears, at its two ends, terminals for connection to a source of electrical supply. In this device, the metal sheet is hermetically enclosed between two sheets of plastics material, by welding of these sheets, and this assembly is fixed, by means of clips, under a textile covering constituting the floor of the room to be heated. The electrical supply of the heating metal sheet is effected at low voltage, less than 42 volts, via a transformer and a current regulator. Such a heating device is particularly advantageous because it is completely safe as far as the risks of fire are concerned, due to its low-voltage supply. However, as it is incorporated in the carpet placed on the floor of a room to be heated, it must be fitted exactly to the dimensions of this room. Furthermore, it can only be used on the floor and is absolutely unfit for an installation on a wall or beneath a ceiling, which may be desirable in many cases for reasons of convenience of installation and of efficiency of heating.

The present invention concerns improvements made to these heating devices so as to procure a device presenting total operational safety, particularly with regard to risks of fire, ensuring an efficient and adjustable heating as desired and able easily to be installed on a wall or beneath a ceiling of a room.

To that end, this device for heating by infrared radiation, fixed on a wall or beneath the ceiling of a room of a building, comprising a flat infrared radiation emitter constituted by a sheet made of an electrically conducting material connected to a source of supply of low-voltage electric current, is characterized in that the electrically conducting sheet forms part of a composite band and it is coated, on its face turned towards the interior of the room to be heated, with a thin black layer, with high emissive power, and, on the opposite side, with a sheet forming reflector of the infrared radiation in the direction of the interior of the room.

An embodiment of the present invention will be described hereinafter by way of non-limiting example, with reference to the accompanying drawing, in which.

Figure 1:
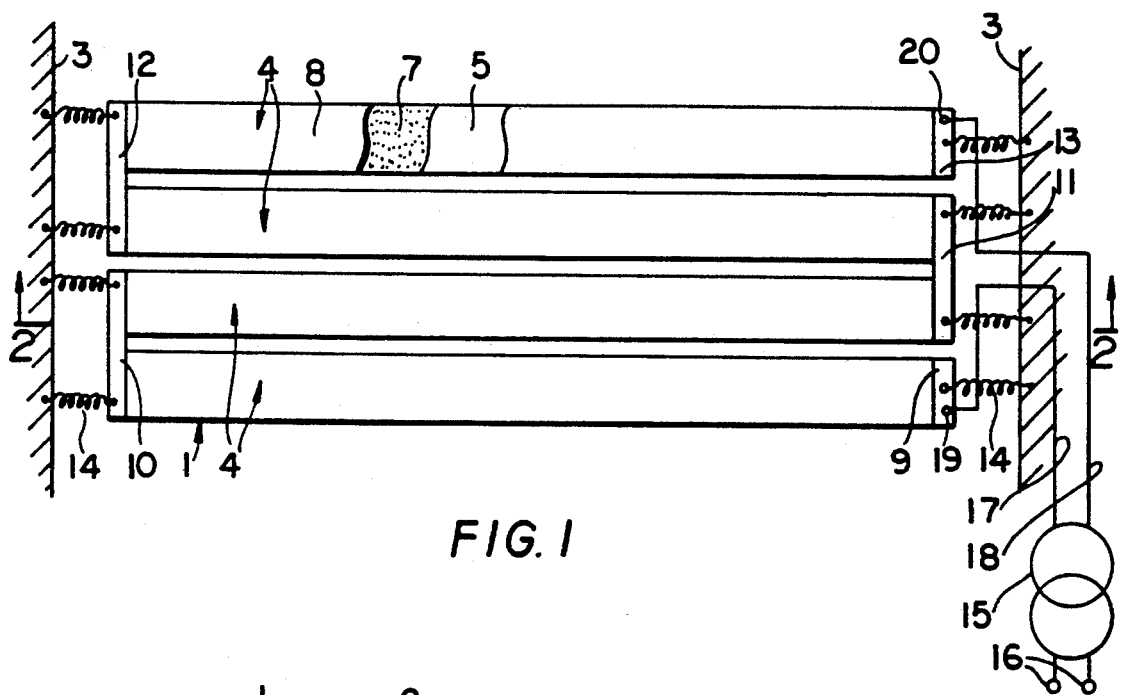
FIG. 1 is a plan view of a device for heating by infrared radiation according to the invention, mounted beneath the ceiling of a room.
Figure 2:
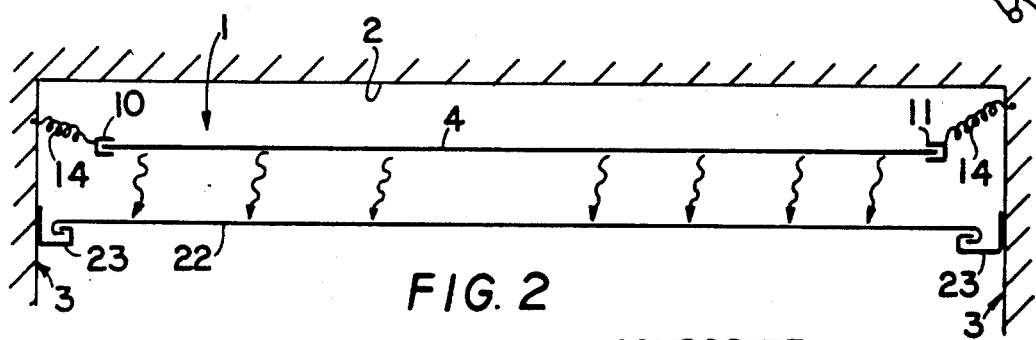
FIG. 2 is a view in vertical section made along line II—II of FIG. 1.
Figure 3:
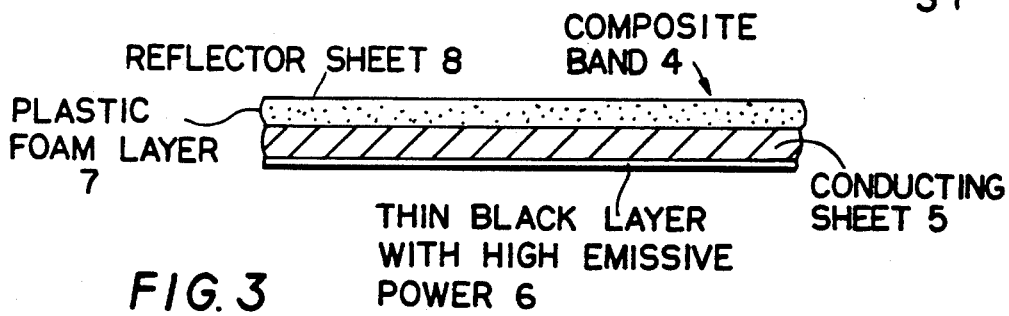
FIG. 3 is a view in vertical and transverse section, on a larger scale, of an elementary composite band forming part of the heating device.

The heating device according to the invention which is indicated as a whole by reference 1 in FIGS. 1 and 2, extends horizontally beneath the ceiling 2 of a room to be heated, between the walls 3 of this room. However, such assembly is not limiting and the heating device 1 might equally well extend vertically, parallel to a wall 3.

The heating device 1 is constituted by a plurality of parallel composite bands 4 which extend in the same horizontal plane. Each composite band 4, of rectangular shape, comprises, in its lower part, a thin sheet 5 having for example a thickness of 0.2 millimetre, made of an electrically conducting material such as aluminium. This thin electrically conducting sheet 5 is coated, on its face which is turned towards the interior of the room, i.e. on its lower face in this particular application, with a layer of black matter 6, with high emissive power, to increase the radiation in the direction of the interior of the room. Furthermore, the composite band 4 comprises, above the thin conducting sheet 5, a layer 7 of plastics foam on which is finally applied a thin sheet 8, metallic or metallized, forming an upper reflector for the infrared radiation.

Figure 4:
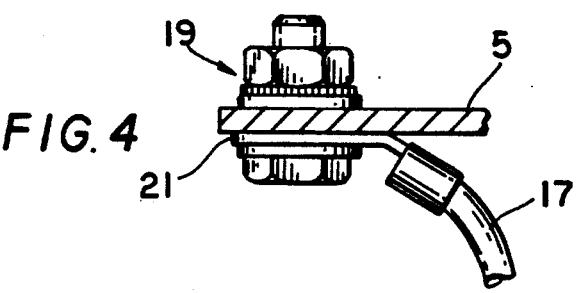
FIG. 4 is a view in elevation of a device for the electrical connection of a supply cable and an electrically conducting sheet.

The parallel composite bands 4, for example four in number in the non-limiting example described, are fixed, at their ends, to transverse supports 9, 10, 11, 12, 13 which are themselves fastened to the walls 3 by appropriate suspension means 14, such as springs. The supports 9–13 are advantageously constituted by connecting bars in which are gripped and fixed to the ends of the composite bands 4 and which are arranged so as to establish the continuity of the sinuous or meandering electrical circuit formed by the thin conducting sheets 5 of the different composite bands 4 and to connect this continuous circuit to a source of low-voltage electrical current, for example 48 volts or less. This source of current is represented by a transformer 15 whose primary winding is connected to the terminals of the mains 16 and whose secondary, low-voltage winding is connected, by cables 17, 18, respectively to two terminals 19, 20. Terminal 19 is borne by the end connecting bar 9 whose width corresponds to that of a composite band 4, and this terminal 19 establishes the electrical connection between the supply cable 17 and the right end of the thin conducting sheet 5 forming part of the first composite band 4 connected to the bar 9. FIG. 4 illustrates in greater detail an embodiment of the terminal 19. This terminal comprises a bolt passing right through the thin conducting sheet 5. This bolt maintains a terminal-connector 21 which is fixed to the cable 17, applied against the thin conducting sheet 5 in order to ensure the electrical connection. According to a variant, the connection might equally well be effected by welding the ends of the cables 17, 18 directly on the thin conducting sheets 5.

The first composite band 4 of the heating device 1 extends from the end connecting bar 9 to the intermediate connecting bar 10 which, itself, has a length greater than twice the width of a composite band 4. This intermediate connecting bar 10 establishes an electrical connection between the left ends of the thin conducting sheets 5 of the first and second elementary composite bands 4. In the same way, the right end of the second elementary composite band 4 is maintained by the intermediate connecting bar 11 also maintaining the right end of the third elementary composite band 4 and ensuring the electrical connection between the thin conducting sheets 5 of the second and third bands 4. The left end of the third composite band 4 is maintained by the intermediate connecting bar 12 which also maintains the left end of the fourth band 4 and establishes an electrical connection between the thin conducting sheets 5 of the third and fourth bands 4. Finally, the right end of the fourth band 4 is maintained by the end connecting bar 13 bearing the terminal 20 connected to the supply cable 18.

FIG. 2 illustrates a particular use of the device 1 for heating by infrared radiation, according to the invention. In that case, this device 1 extends above a horizontal sheet 22 which is stretched and fastened, along its edges, to rails 23 constituted by sections fixed to the walls 3, forming a horizontal frame around the room. Consequently, the heating device 1 is totally hidden and the infrared radiation that it emits towards the interior of the room passes without hindrance through the horizontal sheet 22 which, to that end, is made of a material permeable to such radiation.

The heating device 1 according to the invention may also be used in the form of a cartridge or an independent panel comprising a peripheral frame on which the parallel composite bands 4 are mounted.

I claim:

1. A heating device for heating a room by infrared radiation adapted to be fixed onto a wall or beneath a ceiling of a building room, comprising:
   a composite band including a conductive sheet having a length dimension provided with an inner face facing the interior of the room and an outer face facing opposite thereto and having first and second ends at the end of said length dimension opposite to each other and including:
   a thin black layer coating coated onto said inner face and having a high emissive power,
   an insulating plastic foam layer located on said outer face and positioned immediately thereon, and
   a reflective sheet located on and positioned on said insulating plastic foam layer on an outer side thereof for reflecting infrared radiation towards the interior of the room;
   elastic electrically conductive mechanical support means connected with each of said first and said second ends for maintaining the composite band in a substantially uniform condition and prevent sagging; and
   electrical connection means coupled with said first and said second ends through said mechanical support means for connection of said composite bands to a supply source; and
   a heat permeable, decorative member forming a false wall or ceiling which renders said composite band hidden from view while in the room interior.

2. The device of claim 1, wherein said composite band includes at least a first individual conductive composite member and a last individual conductive composite member, an individual one of said mechanical means being connected with one end of each of said individual conductive composite member and another mechanical means electrically coupling the other ends of said individual conductive composite member, and said electrical connection means being connected with each of said individual mechanical means.

3. The device of claim 1, wherein said device includes a plurality of said composite bands comprising a first, a last and at least one intermediate composite band, each of said composite bands lying in a common horizontal plane and being maintained therein by said elastic electrically conductive mechanical support means including said first and said second ends, and one of said mechanical means being connected with said first ends of said first and said last composite band, and said electrical means being connected with each of said one mechanical means.

4. The device of claim 3, wherein others of said mechanical means connect other ends of adjacent conductive bands together.

5. The device of claim 3, wherein others of said intermediate composite bands are connected with other ends of the adjacent first and last composite bands.

6. The device of claim 5, wherein two adjacent unconnected ends of said adjacent intermediate composite bands are connected together by one of said mechanical means.

7. The device of claim 1, wherein said device includes a plurality of said composite bands each having said first and said second ends and including two outer composite bands and at least one intermediate composite band, said mechanical means coupling one end of each adjacent composite band to the other, and an individual one of each of said mechanical means for a free end of each of said outer composite bands for connection with said electrical connection means.

8. The device according to claim 1, comprising:
   a plurality of said composite bands each having first and second ends, each of said composite bands lying in a horizontal plane and being maintained therein by said electrically conductive mechanical support means;
   a first band of said plurality of said composite bands being connected so that one end comprises said electrically conductive mechanical support means having said electrically conductive connection means at said end and being connected to said supply source;
   a remaining end of said first composite band being connected to the same end of an adjacent composite band of said plurality of composite bands by said electrically conductive mechanical support means, said electrically conductive mechanical support means being electrically conductive and providing an electrical path from the conducting sheet of said first composite band to said adjacent composite band;
   remaining ends of adjacent composite bands of said plurality of composite bands being mechanically supported and electrically connected to the same unconnected ends of an adjacent composite band until all but the last composite band is supported at both ends forming a sinuous or meandering, continuous electrical path from one end of the device to the other while lying in said horizontal plane; and
   a remaining end of a last composite band of said plurality of composite bands comprising said electrically conductive mechanical support means and having said electrical connection means at said end and being connected to said supply source.

9. The device of claim 1, wherein said conductive sheet is 0.2 millimeters thick.

10. The device of claim 7, wherein said conductive sheet is 0.2 millimeters thick.

11. The device of claim 1, wherein said electrical connection means is a terminal or a weld.

12. The device of claim 2, wherein said electrical connection means is a terminal or a weld.

13. The device according to claim 1, wherein said mechanical support means include springs attached to the walls or ceiling and to said composite band.

14. The device according to claim 2, wherein said mechanical support means includes springs attached to the walls or ceiling and to said conductive composite member.

15. The device according to claim 3, wherein said mechanical support means includes springs attached to the walls or ceiling and to said composite bands.

16. The device according to claim 5, wherein said mechanical support means includes springs attached to the walls or ceiling and to said composite bands.

17. The device according to claim 6, wherein said mechanical support means includes springs attached to the walls or ceiling and to said composite bands.

18. The device according to claim 7, wherein said mechanical support means includes springs attached to the walls or ceiling and to said composite bands.

19. A heating device for heating a room by infrared radiation adapted to be fixed onto a wall or beneath a ceiling of a building room, comprising:
 a plurality of composite bands each having first and second ends and each of said composite bands lying in a horizontal plane;
 each said composite band including a conductive sheet having a length dimension provided with an inner face facing the interior of the room and an outer face facing opposite thereto and having first and second ends at the end of said length dimension opposite to each other and including:
 a thin black layer coating coated onto said inner face and having a high emissive power,
 an insulating plastic foam layer located on said outer face and positioned immediately thereon, and
 a reflective sheet located on and positioned on said insulating plastic foam layer on an outer side thereof for reflecting infrared radiation towards the interior of the room;
 mechanical support means connected with each of said first and said second ends for maintaining all of said composite bands in a substantially uniform condition in said horizontal plane and prevent sagging; and
 electrical connection means coupled with said first and said second ends through said mechanical support means for connection of said composite bands to a supply source;
 a first band of said plurality of said composite bands being connected so that one end comprises said mechanical support means having said electrical connection means at said end and being connected to said supply source;
 a remaining end of said first composite band being connected to the same end of an adjacent composite band of said plurality of composite bands by said mechanical support means, said mechanical support means being electrically conductive and providing an electrical path from the conducting sheet of said first composite band to said adjacent composite band;
 remaining ends of adjacent composite bands of said plurality of composite bands being mechanically supported and electrically connected to the same unconnected ends of an adjacent composite band until all but the last composite band is supported at both ends forming a sinuous or meandering, continuous electrical path from one end of the device to the other; and
 a remaining end of a last composite band of said plurality of composite bands comprising said mechanical support means and having said electrical connection means at said end and being connected to said supply source.

20. The device according to claim 19, including a heat permeable, decorative member forming a false wall or ceiling which renders said plurality of composite bands hidden from view while in the room interior.

* * * * *

UNITED STATES PATENT AND TRADEMARK OFFICE
CERTIFICATE OF CORRECTION

PATENT NO. : 5,159,176
DATED : October 27, 1992
INVENTOR(S) : Fernand Scherrer

It is certified that error appears in the above-identified patent and that said Letters Patent is hereby corrected as shown below:

On the title page, Item [76]: Inventor should read:

— Fernand Scherrer, 2 rue Georges-Bizet
68170 Rixheim, FRANCE —

Signed and Sealed this

Twelfth Day of October, 1993

Attest:

BRUCE LEHMAN

Attesting Officer

Commissioner of Patents and Trademarks